United States Patent
Ayed

(10) Patent No.: US 6,756,913 B1
(45) Date of Patent: Jun. 29, 2004

(54) SYSTEM FOR AUTOMATICALLY DISPATCHING TAXIS TO CLIENT LOCATIONS

(76) Inventor: Mourad Ben Ayed, 107 Quebec Ave #3, Toronto Ontario (CA), M6P 2T3

(*) Notice: Subject to any disclaimer, the term of this patent is extended or adjusted under 35 U.S.C. 154(b) by 0 days.

(21) Appl. No.: 09/431,123

(22) Filed: Nov. 1, 1999

(51) Int. Cl.[7] ................................................. G08B 5/22
(52) U.S. Cl. .................. 340/825.49; 340/991; 340/993; 340/994; 340/434; 340/825.47; 235/384; 705/5; 705/13
(58) Field of Search ................................ 340/991, 993, 340/994, 434, 825.47, 825.49; 235/384; 705/5, 13

(56) References Cited

U.S. PATENT DOCUMENTS

| | | | |
|---|---|---|---|
| 4,737,977 A | 4/1988 | Norman | 379/58 |
| 5,043,736 A | 8/1991 | Darnell et al. | 342/357 |
| 5,168,451 A | 12/1992 | Bolger | 364/436 |
| 5,799,263 A * | 8/1998 | Culbertson | 701/117 |
| 5,945,919 A | 8/1999 | Trask | 340/825.491 |
| 5,973,619 A * | 10/1999 | Paredes | 340/994 |
| 6,108,554 A * | 8/2000 | Kawamoto | 455/456 |

OTHER PUBLICATIONS http://www.sirf.com/c4d.tp.E911 rev 3. et al, Sep. 06, 1999, Fcc's E911 mandate.
http:://www.mbsoft.com/prod01.html, Sep. 06, 1999, Web Page "Products" regarding Taxi pak.
061807, 1992, English Language Abstract of Japanese Patent Application #04333270 Title : "Car Allocation System" © 1994 JPO&Japio, Dec. 14, 1992
093218, 1996, English Language Abstract of Japanese patent application #08172743 ©1994 JPO & Japio, May 30, 1996.

* cited by examiner

Primary Examiner—Daryl C. Pope
(74) Attorney, Agent, or Firm—Brinks Hofer Gilson & Lione; Daniel B. Schein, Esq.

(57) ABSTRACT

A system and method for dispatcher free vehicle allocation. A client requesting taxi service calls a taxi dispatch center using a cellular phone equipped with a location identification device. The location identification device provides the current location information to the dispatch center. The taxi dispatch center keeps track of available taxis and their locations and stores them in a database. After determining the client location data, a processor searches the available taxis database for a taxi whose location matches the client's location. The client location data is converted to an address and sent to the assigned taxi. The address is displayed on a mobile data terminal in the taxi.

5 Claims, 7 Drawing Sheets

SYSTEM FOR AUTOMATICALLY DISPATCHING TAXIS TO CLIENT LOCATIONS

FIELD OF THE INVENTION

This invention is directed generally to the field of transportation services and more specifically to the field of automatically dispatching taxis to client locations.

BACKGROUND OF THE INVENTION

U.S. Pat. No. 4,737,977 discloses an automatic taxi dispatch system that has access to an on-line telephone directory and a stand-by memory containing information about available taxis. When a client calls a telephone exchange to request taxi service, the client's phone number is determined. The on-line directory is searched for the address corresponding to the client's telephone number. The stand-by memory is searched for the taxi in first place. The taxi is provided with the client address via radio. This system does not work if the user uses a mobile phone because the client's location cannot be determined using a telephone directory. Furthermore, this system cannot allocate the most efficient taxi to service the client because it does not maintain the locations of available taxis.

U.S. Pat. No. 5,168,451 discloses another method for automatically dispatching vehicles. A client uses a service request terminal to transmit a service request to a central dispatch controller. A central computer determines the most efficient vehicle to dispatch to the client location by calculating the total added travel distance to service the request destination in relation to the dispatches previously assigned to each vehicle. The service request is dispatched to the vehicle with the minimum added travel distance. This method requires the use of service request terminals and may not be accessible from any location.

Japanese patent 06180797 discloses another method for automatically dispatching vehicles to clients. When a customer makes a request for a taxi, a taxi center determines its approximate location. Taxis in the zone of the client are requested to provide current position and status information (available/occupied). The taxi center selects a taxi and sends a vocal car allocation indication to the driver of the vehicle. This system requires the presence of an operator.

Japanese patent 09321882 discloses a method for contacting the nearest taxi allocation center from a nationwide calling number. The client calls a nationwide taxi allocation center. The rough position of the ordering person is determined from the location of a portable telephone relay antenna nearest to the ordering person. The order is transferred to the taxi allocation center nearest to the client. Next, the operator of the car allocation center communicates with the ordering person, requests detailed location information, and allocates a taxi. This system requires the presence of an operator.

Tendler Cellular has adapted GPS and speech technology to cellular phones and created a chip set that goes into cellular phones so that with the touch of a 911 button a verbal emergency message "tells" the police the location of an emergency. This system does not have the capability to dispatch emergency vehicles to client locations.

TaxiPak dispatch system produced by MobileSoft Consulting Inc. is a software application that provides computer aided dispatch services to taxi fleet operations. Each taxi is equipped with a GPS receiver that periodically sends a geographic position to the TaxiPak application. The system allows tracking of all taxis in the fleet for dispatch as well as for handling emergencies. This system cannot determine the locations of clients especially when they are using mobile phones.

FCC E911 mandate requires cellular phone operators to be able to locate cellular phone users and provide 911 emergency services. Several technologies have been proposed as a solution. One of the technologies to locate cellular phone users is to integrate a Global Positioning System (GPS) receiver in the cellular phone. In case of emergency, the handset determines the location of the user and sends it to an emergency center. Another technology is a server assisted GPS where a portion of the GPS receiver functions is carried on a server and the other portion is carried on the handset. In case of emergency, the handset or the server determines the location of the user and sends it to an emergency center. Another technology is network triangulation. In case of emergency, a location measurement unit determines the location of the user and sends it to an emergency center. These systems are capable of determining a cellular phone user location with a precision better than 125 meters.

Thus there is a need for a system that can automate the dispatching of taxis to client locations. The system collects client requests for taxis and their GPS positions from locator devices installed in the cellular handsets. The system also collects the GPS positions of available taxis using locator devices and sensors installed in taxis and stores them in a database. To dispatch a taxi, the system searches its database for a taxi with a location nearest to a client location using a matching algorithm. The client GPS location is translated to a street address using a digital map database and is sent to a mobile terminal inside the taxi. The system is automatic, efficient and flexible. The matching algorithm can be changed to take into account traffic, geographical and topological information.

SUMMARY OF THE INVENTION

According to one aspect of the invention, there is provided a system for dispatching commercial vehicles to client locations comprising a telephone exchange to receive request calls and client location data; means to extract said client location data; means to convert client location data into a client address; a radio center to send the client request and address to a commercial vehicle;

According to another aspect of the invention, there is provided a method for dispatching commercial vehicles to client locations whereby a telephone exchange receives request calls and client location data; a base unit extracts said client location data; a conversion unit converts said client location data into client address; a radio center sends the client request and address to a commercial vehicle;

According to another aspect of the invention, there is provided a method for dispatching commercial vehicles to client locations whereby a telephone exchange receives request calls and client location data; a base unit extracts said client location data; a radio center receives notices from commercial vehicles indicating their status and location data; a database system stores an updated list of available commercial vehicles and their corresponding location data; a processor searches said database for a vehicle whose location matches the location of a client requesting vehicle service; If a match is found, a conversion unit converts said client location data into an address and the radio center sends the client information and address to the assigned commercial vehicle.

According to another aspect of the invention, there is provided a method for indicating that a commercial vehicle is available to a dispatching center comprising on indication that the vehicle is available, periodically determine the vehicle's current location data using a location identification device and send the vehicle identification and said current location data to the dispatching center, until the vehicle becomes unavailable.

BRIEF DESCRIPTION OF THE DRAWINGS

The present invention will be more clearly understood after reference to the following detailed specifications read in conjunction with the drawings wherein.

Similar reference numerals are used in different figures to denote similar components.

DETAILED DESCRIPTION OF THE PREFERRED EMBODIMENT

Figure 1:
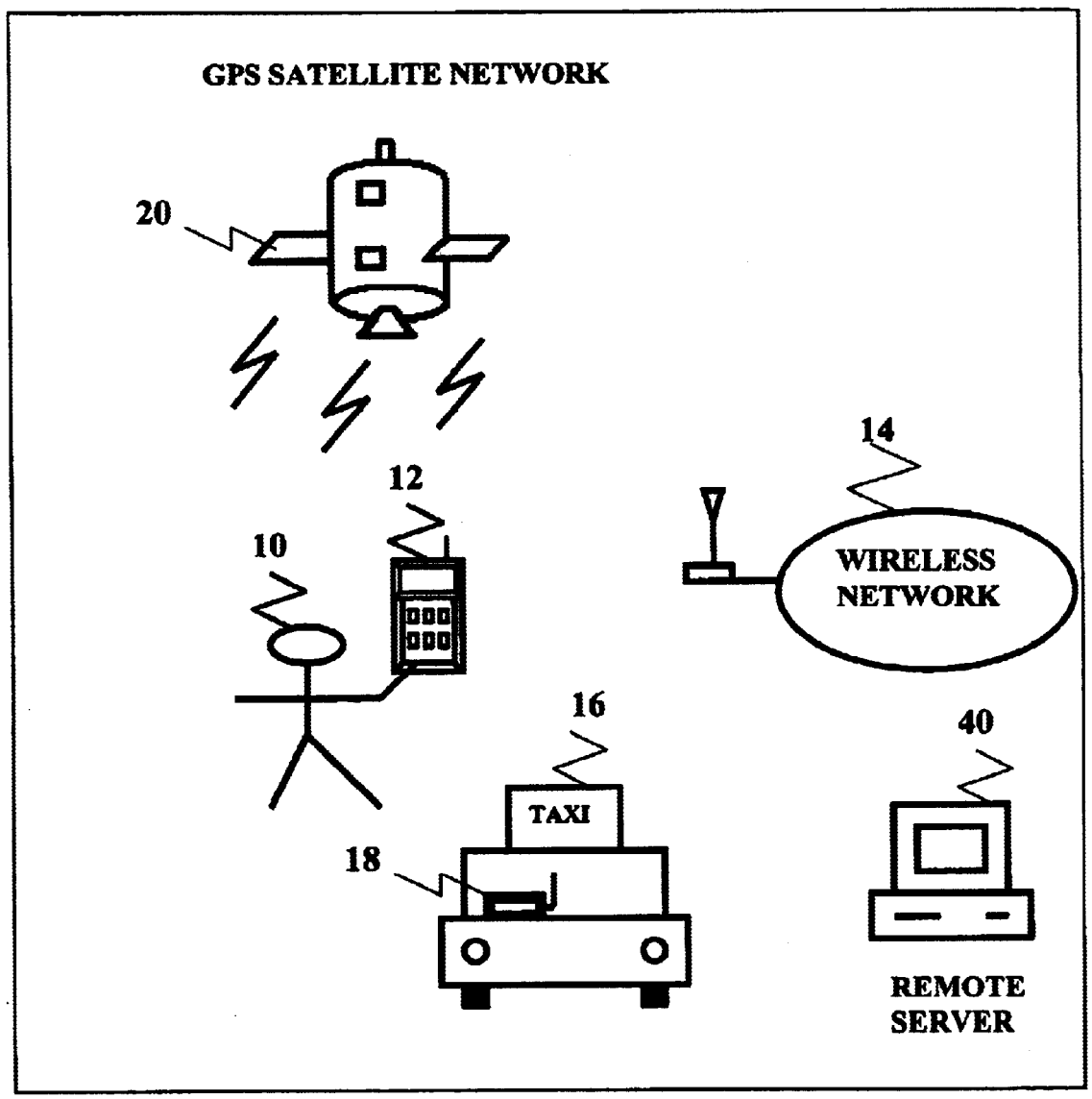
FIG. 1 is a schematic of a system for automatically dispatching taxis to client locations.

Referring to FIG. 1, the system for automatically dispatching taxis to client locations is composed of a Handset 12 carried by client 10, mobile data terminal 18 installed in taxi 16 and remote server 40. The Handset and mobile data terminal communicate with the server through a wireless network 14. Handset 12 and mobile data terminal 18 use GPS 20 to determine current position data.

It will be understood that GPS 20 may alternatively be a GLONASS, LORAN, GNSS, or any other commercially available service, or combination of services, that provides global position information.

Figure 2:
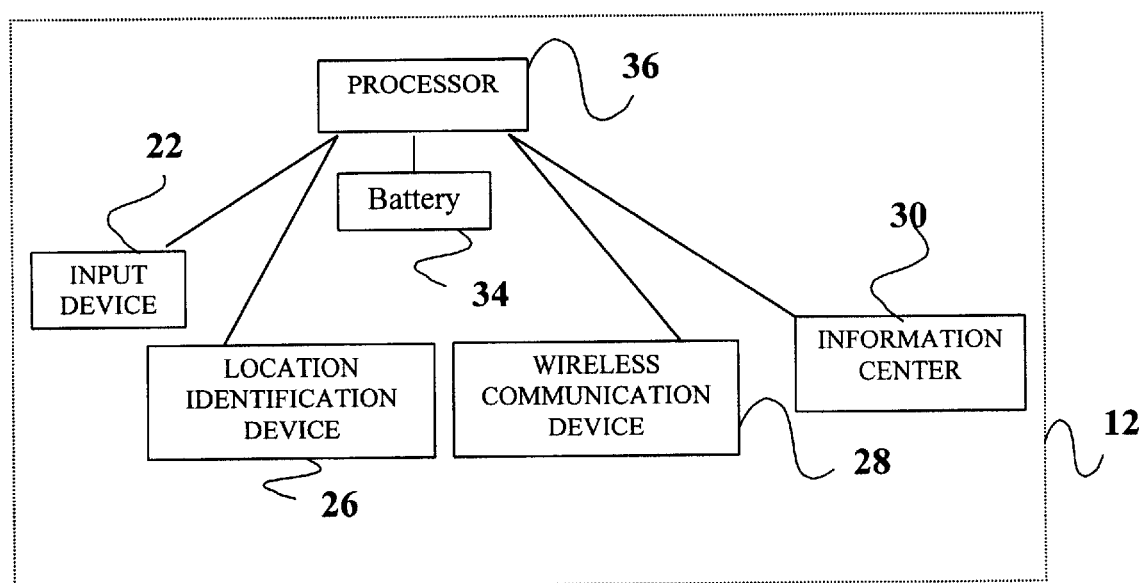
FIG. 2 is a block diagram of a handset used by a client requesting taxi service.

Referring to FIG. 2, handset device 12 comprises a processor 36, an input device 22, a location identification device 26, a wireless communication device 28, an information center 30, and a battery 34.

Processor 36 coordinates between the different systems and is in charge of calculations.

The client uses input device 22 to dial numbers, establish a communication with server 40 (FIG.1) and request a taxi. Input device 22 may be any suitable type of user input device such as a keyboard, pointing device (e.g. mouse), a touch sensitive display, a microphone, a voice recognition system or any combination of such devices.

Information center 30 conveys information to a user. It is preferably a compact speaker. Information center 30 may also be a liquid crystal display ("LCD"), a cathode ray tube, a plasma discharge display, any combination of such devices or any other audible or visual means capable of conveying information to the user.

Figure 3:
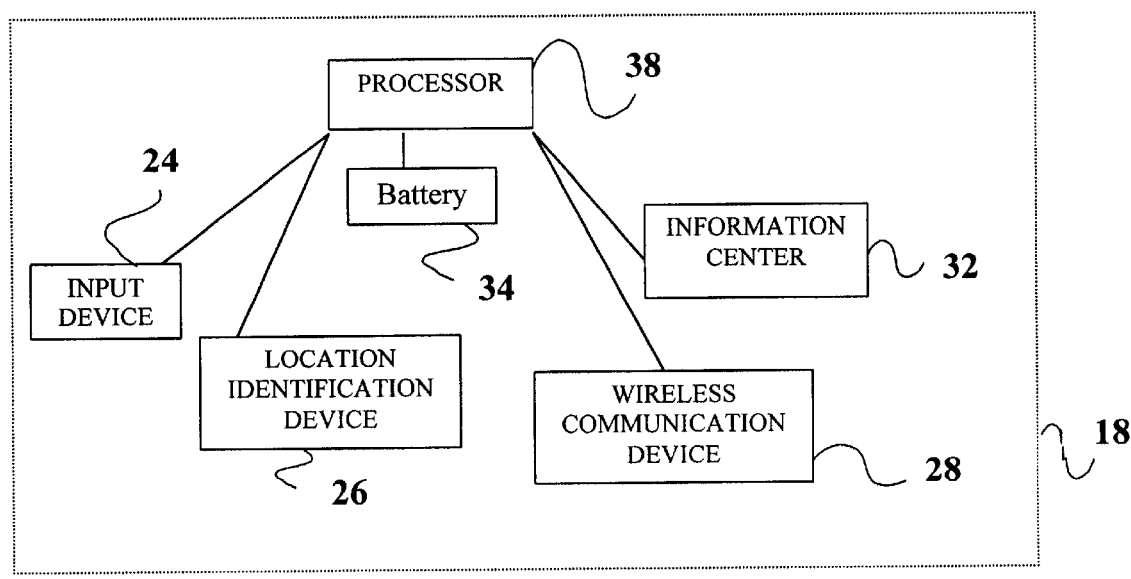
FIG. 3 is a block diagram of a mobile data terminal used by taxis.

Referring to FIGS. 2 and 3, location identification device 26 is used to determine the current location. Location identification device 26 may be a GPS receiver that cooperates with a publicly available GPS 20 (FIG.1) to determine the user's current position information. Location identification device 26 may be a server assisted GPS system such as SnapTrack Inc.'s Enhanced GPS system where a wireless server carries some of the functions of a traditional GPS receiver and may enhance position information by applying differential GPS corrections. Device 26 may use cellular network triangulation to determine the current position. Device 26 may be any device capable of determining the current position information.

Communication device 28 is used to communicate with a wireless network 14 (FIG. 1). Communication device 28 may be a modem, a cellular phone, a personal communication device, a pager or any other communication device capable of accessing a wireless network.

Battery 34 provides power to all components of the Handset 12. It will be understood that battery 34 may be a nickel-cadmium, lithium, alkaline or nickel-hydride battery or any other source of electric power. When the Handset 12 is not in operation it remains in a dormant state ("sleep-mode") to conserve the energy of power source 34.

Referring to FIG. 3, mobile data terminal 18 comprises a processor 38, an input device 24, a location identification device 26, a wireless communication device 28, an information center 32, and a battery 34.

Processor 38 periodically verifies the status of input device 24 to determine if the taxi is occupied or not and takes action accordingly. If the taxi is available, processor 38 determines the position information of the taxi and sends the information to server 40 (FIG. 1).

Input device 24 collects information about the state of the taxi (occupied/available). It is connected to external sensor means. One such external sensor means is an output of the meter that indicates if the meter is activated or not, and thus indicates if the taxi is occupied or not.

Information center 32 conveys information to a user. It is preferably a liquid crystal display ("LCD"). Information center 32 may also be a cathode ray tube, a plasma discharge display, a compact speaker or any other audible or visual means capable of conveying information to the user.

Figure 4:
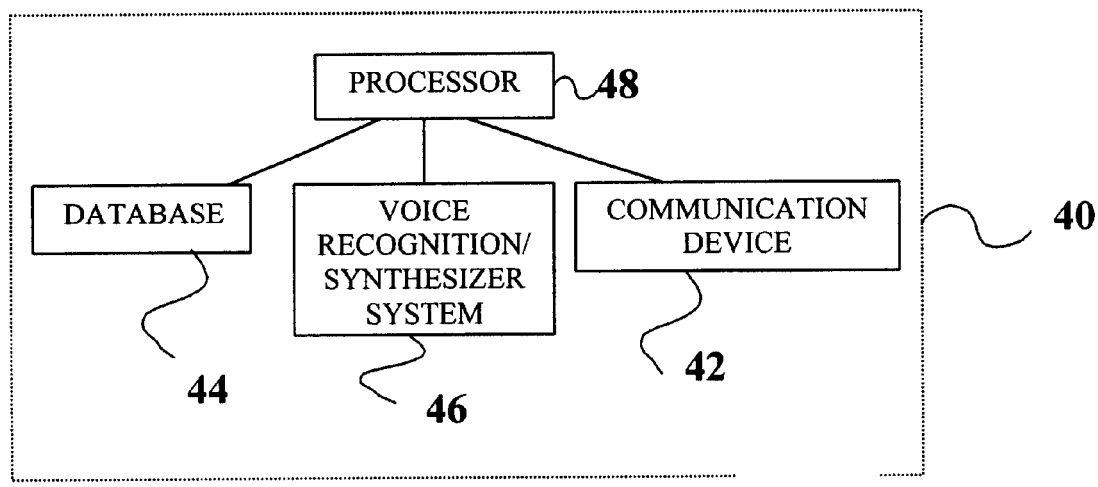
FIG. 4 is a block diagram of a server.

Referring to FIG. 4, server 40 contains a processor 48, a database 44, a voice recognition/synthesizer system 46 and a communication device 42.

Processor 48 coordinates between the different systems and is in charge of calculations.

Database 44 holds location information of available taxis as well as information about clients needing taxi service. Database 44 may hold GPS differential corrections for enhancing the GPS position information. Database 44 may hold digital map information to translate client GPS positions into street locations that can be sent to taxi drivers.

Voice recognition/synthesizer system 46 converts voice to text. It converts user's requests and instructions into a textual form that can be used by server 40. It can also provide the user with vocal information on the identification and arrival time of the allocated taxi.

Communication device 42 allows the server to communicate with handset 12 and mobile data terminal 18 (FIG.1) through cellular network 14 (FIG. 1). Communication device 42 can be an Ethernet card, a cellular modem . . .

Figure 5:
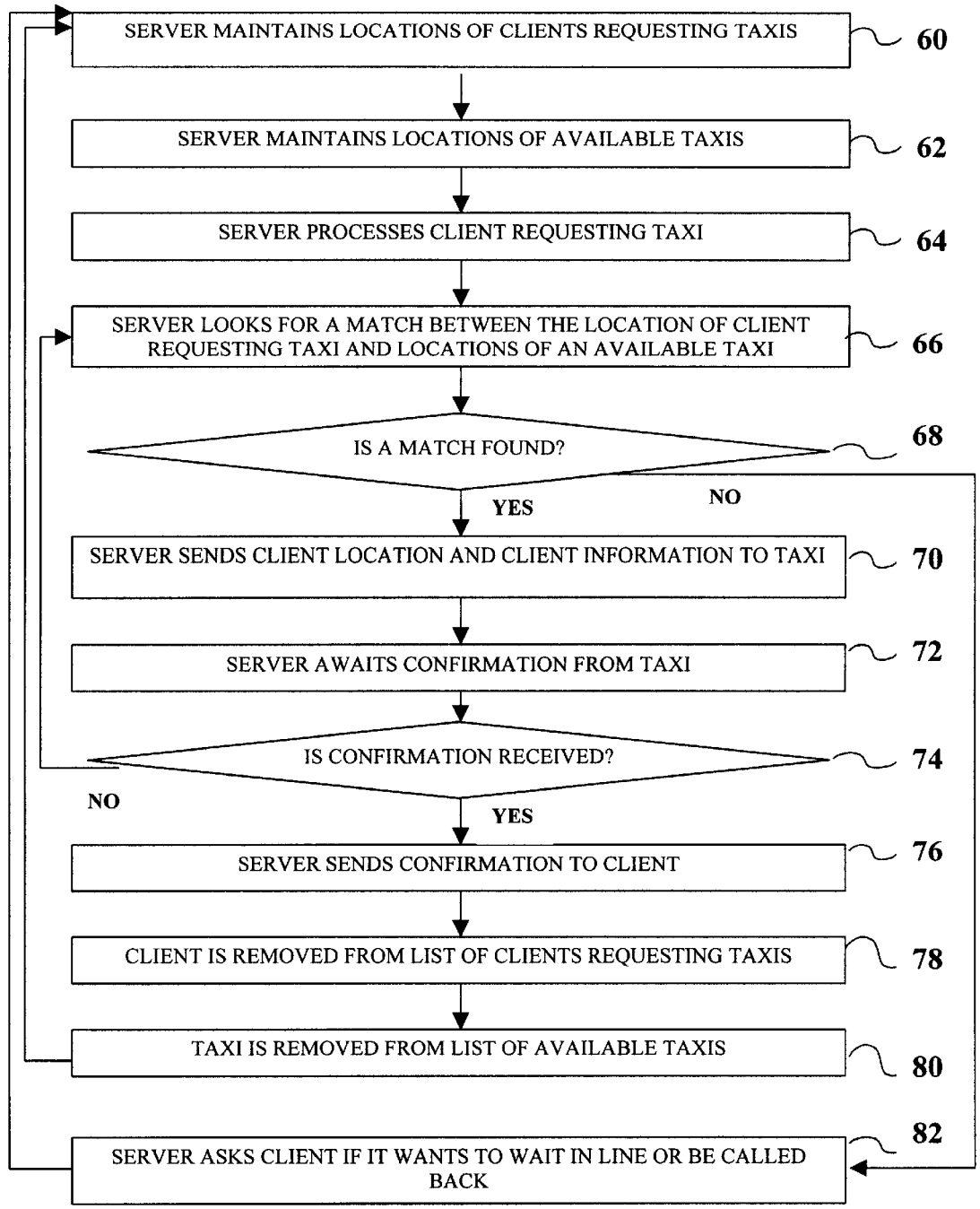
FIG. 5 is a flowchart illustrating the steps involved in dispatching taxis to client locations.

FIG. 5 illustrates a flow chart of the steps involved in dispatching taxis to client locations.

Referring to FIGS. 1 and 4, in step 60, server 40 maintains the locations of clients requesting taxi service. A client makes a request by calling server 40 through handset 12, which provides the current GPS position information to the server. Server 40 adds the client to a list of clients requesting service. In step 62, the server maintains the locations of empty taxis. Mobile data terminal 18 resides in a taxi and periodically verifies if the taxi is available. If the taxi is available, it sends the GPS position information to server 40. Server 40 verifies if the taxi is already in the list of available taxis. If it is, the server updates the status and position information of the taxi, otherwise, the server adds it to the list. In step 64, the server processes a client request for a taxi. In step 66, the server looks for a match between the client location and one of the available taxi locations. In step 68, the server checks if a match is found. There are several methods for seeking a match. One method consists of searching for the taxi that is nearest to the client, and where the distance between the taxi and the client is less than a predetermined maximum distance. Another method consists of getting the first taxi in the pool of available taxis. A third method consists of using the traffic data and possibly the topological and geographical data to estimate the time of arrival of each of the taxis to the client location. The taxi with the least travel time to the client location is selected . . . In step 82, if a match is not found, the server requests if the client wants to wait or to be called back when a match is found, and in the latter case, the server may request the client to provide a contact number. If a match is found. In step 70, server 40 translates the client GPS position into an address using database 44 and sends the client information and address to taxi 16. In step 72, the server awaits taxi acceptance of the client request for service. In step 74, if a confirmation is not received within a predetermined period of time, server 40 looks for another match in step 66. If a confirmation is received within a predetermined period of time, the server sends a confirmation to the client in step 76 together with the taxi information and an estimate of arrival of the taxi to the client location. In step 78, the client is removed from the list of clients requesting taxi service. In step 80, the taxi is removed from the list of available taxis. Next, the server returns to step 60.

Figure 6:
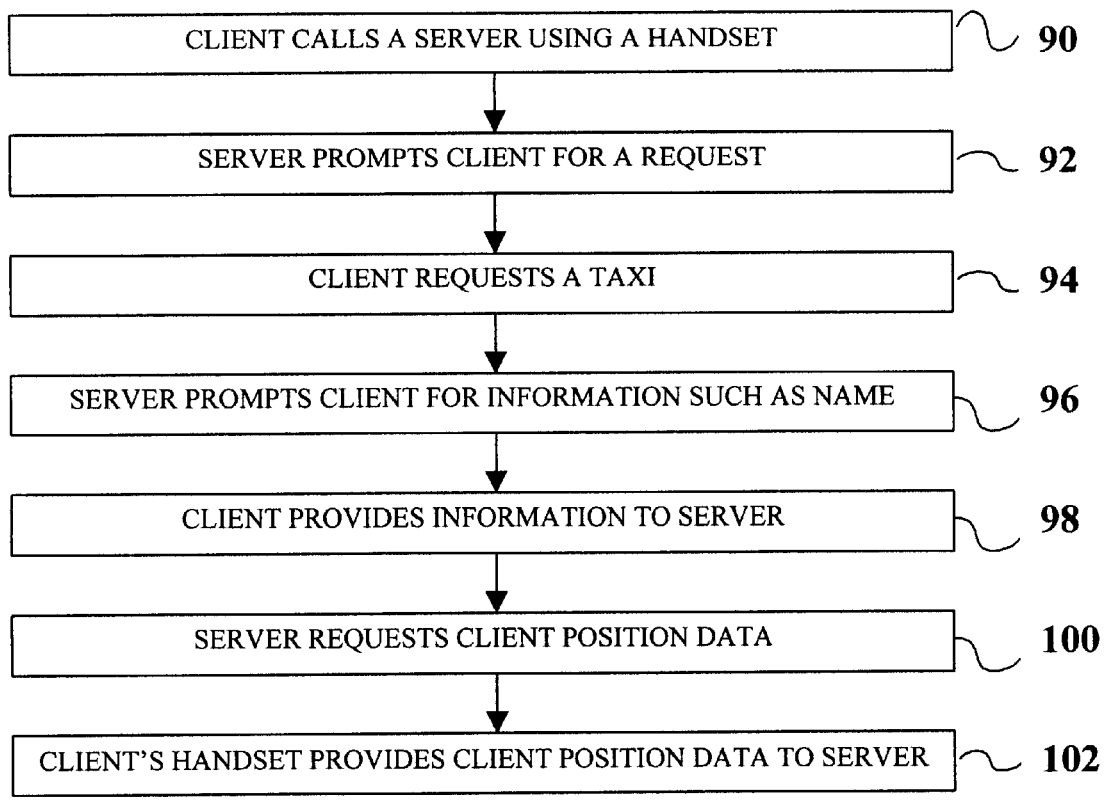
FIG. 6 is a flowchart illustrating the steps involved in logging a client request for taxi.

FIG. 6 is a flowchart illustrating the steps involved in logging a client request for a taxi.

Referring to FIG. 1, in step 90, a client 10 calls server 40 using handset 12. In step 92, the server prompts the user for a request. In step 94, the client requests a taxi. In step 96, the server may prompt the client for information such as name and the client provides the requested information to the server in step 98. In step 100, the server requests the client position data through a verbal message or can send a digital request message to handset 12. In step 102, the handset provides the client's GPS position data to the server. The client may press a button or a menu item on the handset that instructs the handset to determine the current position and send it to the server. In another embodiment, the handset sends a digital message and the position information data to the server. In another embodiment, the handset converts the GPS position to a vocal message using a voice synthesizer and sends the vocal message and the position information to the server. The server translates the position information using a voice recognition system. There are several protocols for communication between a wireless device and a server such as Cellular Digital Packet Data or Short Message System.

Figure 7:
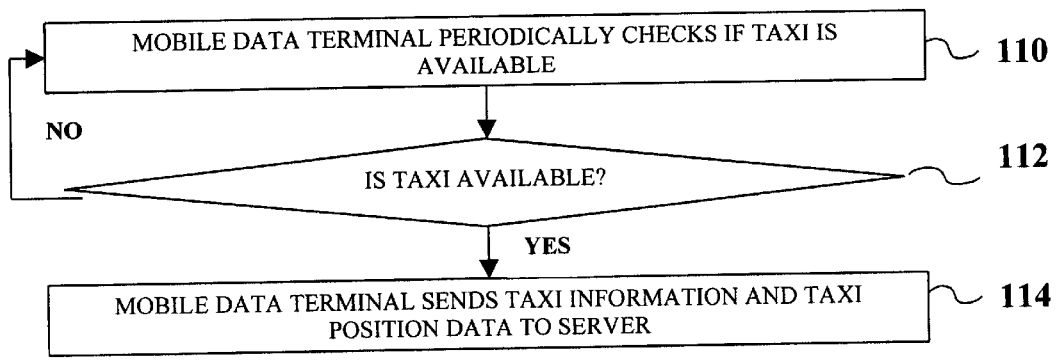
FIG. 7 is a flowchart illustrating the steps involved in indicating that a taxi is available.

FIG. 7 is a flowchart illustrating the steps involved in indicating that a taxi is available.

Referring to FIGS. 1 and 3, in step 110, mobile data terminal 18 installed in taxi 16 periodically checks if the taxi is available. In step 112, the mobile data terminal checks if the taxi is available by reading the data from input device 24. Input device 24 is connected to a port on the meter that indicates if the taxi is available or not. In another embodiment, input device 24 is connected to a sensor that senses if the client seats are occupied or not to determine if the taxi is available. If the taxi is not available, the mobile data terminal goes to "sleep mode" for a predetermined period of time in step 110. If the taxi is available, the mobile data terminal sends a message to server 40 indicating the taxi is available and providing the server with identification information and updated GPS position information. There are several protocols for communication between a mobile device and a server such as Cellular Digital Packet Data or Short Message System.

Numerous other modifications, variations, and adaptations may be made to the particular embodiments of the invention described above without departing from the scope of the invention defined in the claims.

What is claimed is:

1. A method for sending notifications to a server, comprising:

periodically sensing if a meter on a taxi is active to determine if the taxi is available for customer service;

on sensing that the vehicle is available, periodically:

determining the vehicle's current position coordinates information using a position coordinates determination device;

sending said current position coordinates information to said server.

2. The method of claim 1 wherein said server is a telephone exchange.

3. A system for location in a taxi for sending notifications to a server, comprising:

a position coordinates determination device for obtaining location information;

a transmitter for sending location information obtained from said determination device; and a sensor for sensing if a taxi meter is active or not, thereby indicating availability status, wherein upon sensing of the availability status of the taxi meter, said transmitter sends location information.

4. The system of claim 3 comprising:

a server for receiving requests for taxi service from mobile wireless handsets, said requests containing GPS coordinates of the user requesting taxi service, and for receiving notifications from taxis, said notifications containing GPS coordinates of the taxi, said server comprising:

a database system to maintain a list of available taxis and their corresponding position coordinates information; and a processor to search said database for a vehicle that can service the client request.

5. The system of claim 3 wherein said server is a telephone exchange.

* * * * *